April 6, 1926.

Re. 16,310

A. F. SHORE

SPRING SUSPENSION SYSTEM

Original Filed Dec. 11, 1920 2 Sheets-Sheet 1

INVENTOR
Albert F. Shore,
BY
Geo. A. Hoffman
ATTORNEY

April 6, 1926. Re. 16,310

A. F. SHORE

SPRING SUSPENSION SYSTEM

Original Filed Dec. 11, 1920 2 Sheets-Sheet 2

INVENTOR
Albert F. Shore,
BY
Geo. A. Hoffman.
ATTORNEY

Reissued Apr. 6, 1926. Re. 16,310

UNITED STATES PATENT OFFICE.

ALBERT F. SHORE, OF NEW YORK, N. Y.

SPRING SUSPENSION SYSTEM.

Original No. 1,392,603, dated October 4, 1921, Serial No. 429,841, filed December 11, 1920. Application for reissue filed February 12, 1924. Serial No. 692,376.

*To all whom it may concern:*

Be it known that I, ALBERT F. SHORE, a citizen of the United States, residing at New York, in the county of New York and State of New York, have invented certain new and useful Improvements in Spring Suspension Systems, of which the following is a full, clear, and exact specification.

This invention relates to spring suspension systems, and especially to a spring suspension system for automotive vehicles, and its main object is to provide in such a system means for overcoming the objectionable oscillations set up in the suspended body and converting them into vibrations disposed more vertically and parallel, with greatly reduced amplitude and intensity, thus permitting a corresponding reduction in the weight of all parts of the vehicle, notably the wheels, tires, bearings, axles, etc. This I accomplish by the provision of a third or fulcrum spring set, located approximately midway between the front and rear axles, the function of this spring set being to carry the middle portion of the load, particularly under high road speed.

Another main feature of the invention is the provision of a semi-elastic subframe adapted to carry the fulcrum spring set and its load.

Other features of the invention relate to springs at the front and rear axles of the vehicle and to yieldable opposer means adapted to oppose the springs only when recoils exceed a predetermined amplitude.

These and other objects of the present invention will be hereinafter described and claimed and are illustrated in the accompanying drawings, in which—

Fig. 3 is a plan view, showing the general layout of the body frame, subframe and springs.

Similar characters designate like parts in all the figures of the drawings.

Figure 1:
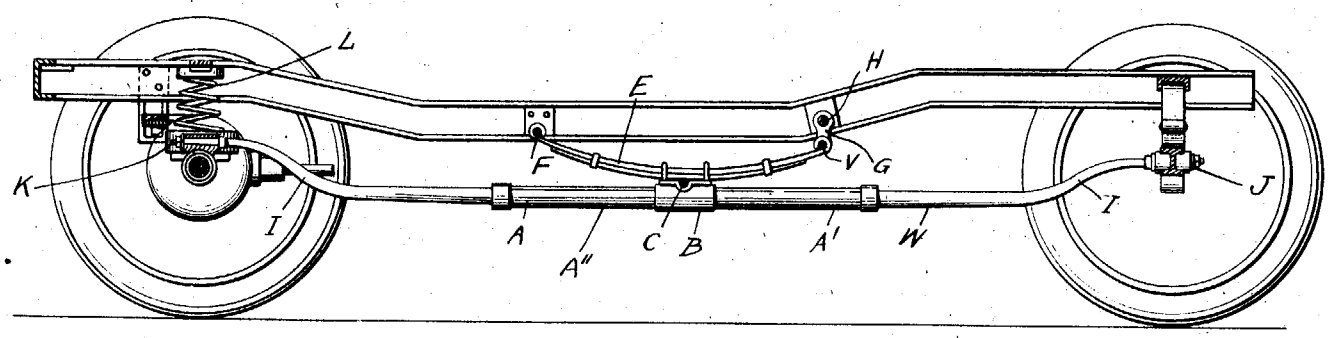
Figure 1 is a side elevation of the general arrangement of my improved suspension system, partly in section, the front body beam not being shown.
Figure 2:
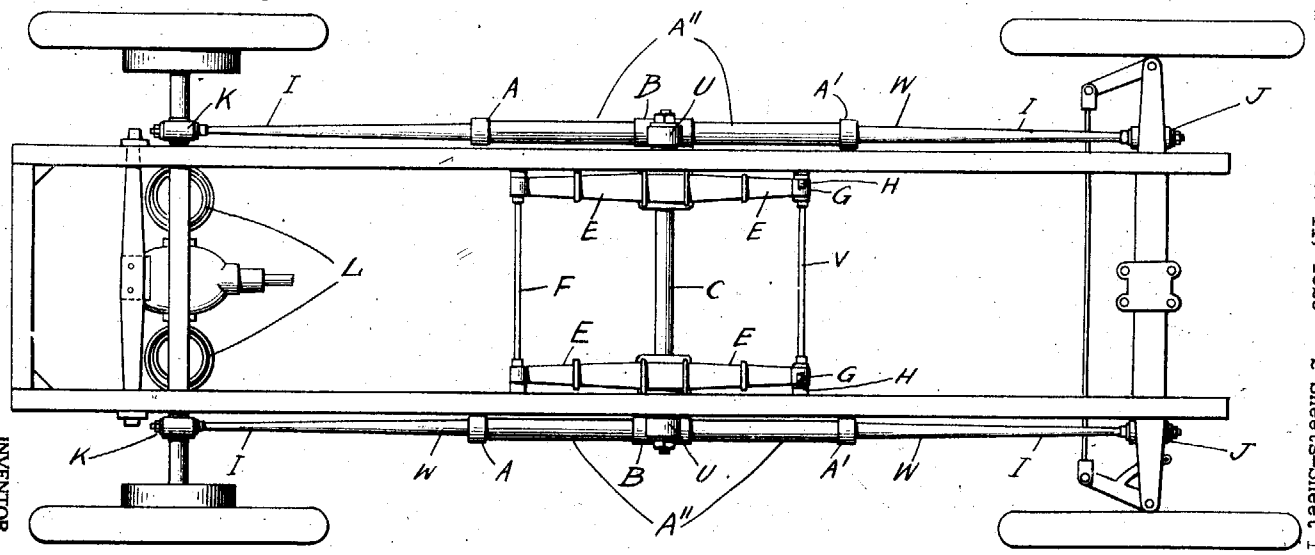
Fig. 2 is a front end elevation, with part of axle beam broken away.
Figure 2:
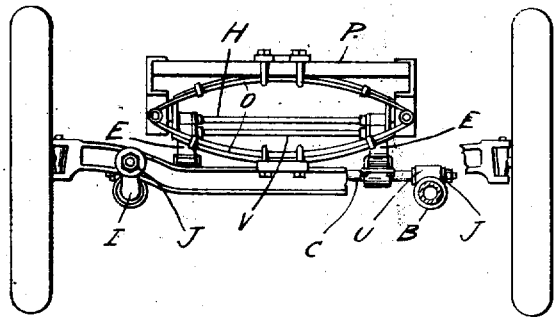
Figure 4:
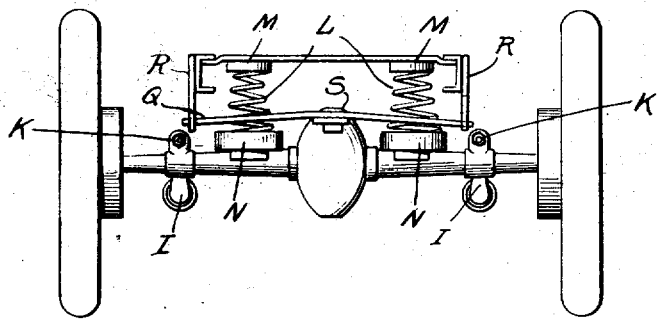
Fig. 4 is a rear elevation of the rear wheel set, showing springs and their saddles, opposer spring and stirrup, etc.

Referring to the drawings, I have shown in Figs. 1 and 3 the general layout of the suspension system as applied to the frame of an automotive vehicle, while in Figs. 2 and 4 are illustrated the spring sets, opposer spring, etc. for the front and rear axles. Herein W designates a semi-elastic subframe, preferably constructed of seamless tubing and having its ends I swaged and heat treated to produce a spring temper. These ends may be shrunk or screwed into a central portion or union at A and A′, reenforcing enlargements A″ being provided to prevent splitting. It will be seen that when these tubular subframe members are bolted rigid or studded free to turn on the front and rear axles at J and K respectively, the two sets of wheels are joined together in such a flexible manner as is necessary for general motor-vehicle construction. This semi-elastic frame is now ready to receive the springs and the frame for the upper structure. Further flexibility is provided by the manner in which these springs are mounted. At B in the center of the semi-elastic sub-frame is a knuckle which has bearings U for mounting a cross-shaft C which is free to turn. On this cross-shaft are mounted the saddles for the fulcrum spring-set E, to which they may be fastened in the usual manner. The members of the spring-set may be unusually wide. The rear ends of said members are connected together by the cross-bar F and the forward ends by the cross-bar or brace V. These cross-bars or braces are integral parts of the upper frame, the cross-bar V passing through links G, which in turn swing on the cross-bar M, which also forms a cross-brace and an integral part of the upper frame. These transverse bars or braces are utilized to produce the proper rigid connection between the subframe and the body frame which is necessary to resist end and side thrusts, especially those encountered in starting or turning a vehicle. It will thus be seen that while the spring-set E is free to rock on the shaft C, it is rigid to longitudinal and lateral thrusts. On the front axle (see Fig. 2) is mounted a full elliptic spring O, whose purpose it is to carry a limited load and at the same time provide the proper cross bracing for the forward upper body to resist side thrusts, as in turning. This spring is mounted and fastened to the axle in the usual manner. Above, it is fastened to the upper frame in the groove of an inverted channel-bar P.

As the upper body has now been rigidly suspended to resist the usual thrusts, it will follow that the rear springs may be of a kind which have no lateral resistance but only compressive resistance. Hence, the helical springs L may be employed. Two of these are mounted on the rear axle in saddles at M and N (see Fig. 4). These axle springs L and O are given exceptional length of stroke and great flexibility, inasmuch as the amplitude of vibration in them sometimes is twice as great as it is in the center fulcrum spring-set E. To guard, however, against undue rebound of the suspended body, particularly in the event of extreme depressions or elevations in the roadway, a counter-acting spring Q, or its equivalent, may be employed. This spring is preferably fastened to the housing of the rear axle, as at S. Its ends are surrounded by the stirrups R—R, respectively, which stirrups are fastened to the upper frame. When the vehicle is without a load, the counter spring Q bears with moderate pressure on the stirrups R. As the load is increased and the upper body frame with said stirrups descends, as the result of the compression of the load-carrier springs, the cantilever ends of the counter spring Q release contact. As the vehicle passes over the ordinary undulations of the road, the ends of the counter spring Q do not touch any part of the stirrups R, remaining idle. When an undue depression in the road is struck, with a tendency for the wheels to be pushed down to the bottom of said depression by the recoil of the load-supporting springs, the counter spring Q instantly contacts with the lower part of the stirrups R and prevents it, thus helping the vehicle to glide over the depression with the least possible jolt to the suspended body and its load upon striking the ascending side of said depression or the level road. Likewise, when obstacles of undue size are passed over by the wheels and as a result the body is thrown up or caused to rebound to exceptional height, the opposer spring Q by virtue of carrying the positive weight of the wheels and axle mountings again retards the undue rebound by contact with the stirrups R, thus adding on suddenly the weight of said wheels and under structure to the weight of the upper body. This at once not only retards the progress of rebound of the upper body but simultaneously confuses the rhythmic vibration which would otherwise be set up for a time after, when the vehicle is again running on the normal roadbed, and hence the said vibration is subdued much more quickly than hitherto.

Inasmuch as lightness of construction and smoothness of riding are the principal objects sought in this invention, it may be necessary to adopt certain modifications of construction, as, for example, a truck carrying a heavy load may require a different kind of truss for the lower frame than would be best for light passenger machines. Likewise, in fastening the ends of the members of said lever frame to the axles, a difference may be made. In a light passenger machine, these may be bolted in tight, as at J and K, so that all twisting motions or strains communicated by the wheels would be met by torsional elasticity of the semi-elastic swaged or reduced extremities. In trucks or heavy passenger machines, because of the larger cross section and less uniform heat treated conditions of the semi-elastic members, it would be necessary to substitute torsional elasticity with studs which turn in bearings, such as the bosses on the axles would then become. These bearings, while allowing the studs to turn, can yet secure the beams of the sub-frame so as to be rigid against end thrusts or prying strains. This feature of securing the longitudinal subframe members pivotally on the axles or axle housings, instead of rigidly, is of especial advantage; for instance, if one of the wheels during the travel of the vehicle mounts an obstacle, a certain amount of pivotal movement will take place in all four bearings, thus avoiding twisting or torsional strains on the frame members.

By supporting the middle portion of the load on the center springs, it will be seen that the subframe plays the part of a fulcrum for the wheels with regard to lifting that portion of the weight of the body when passing over obstructions.

What I claim is:

1. In a spring suspension system, the combination with a subframe fulcrum attached directly to the axles or housings thereof of the front and rear supporting wheel sets, of a fulcrum spring-set hinged on said subframe for free vertical oscillation and positioned approximately midway between said front and rear wheels and adapted for attachment to the beams of a suspended chassis, and springs positioned at the fore and rear ends of said chassis.

2. In a spring suspension system, the combination with a semi-elastic subframe fulcrum attached directly to the axles or housings thereof of the front and rear supporting wheel sets, of a fulcrum spring-set hinged on said subframe for free vertical oscillation and positioned approximately midway between said front and rear wheels and adapted for attachment to the beams of a suspended chassis, and springs positioned at the fore and rear ends of said chassis.

3. In a spring suspension system, the combination with a semi-elastic subframe fulcrum attached directly to the axles or housings thereof of the front and rear supporting wheel-sets, of a fulcrum spring-set hinged on said subframe for free vertical oscillation and positioned approximately midway between said front and rear wheels and adapted for attachment to the beams of a suspended chassis, and springs positioned at the fore and rear ends of said chassis, some of said springs being adapted to resist longitudinal and side thrusts.

4. In a spring suspension system, the combination with a semi-elastic subframe fulcrum attached directly to the axles or housings thereof of the front and rear supporting wheel-sets, of a fulcrum spring-set hinged on said subframe for free vertical oscillation and positioned approximately midway between said front and rear wheels and adapted for attachment to the beams of a suspended chassis, springs positioned at the fore and rear ends of said chassis, and a supplemental spring adapted to oppose said rear springs when the vehicle is without a heavy load.

5. In a vehicle, the combination with a fulcrum subframe having longitudinal beams attached directly to the axles or housings thereof of the supporting wheels, which axles also form cross members for said longitudinal beams, of bearings at or near the middle of said longitudinal beams, a cross-shaft adapted to turn in said bearings, a supporting saddle for said cross-shaft, a spring carried on said saddle and adapted to suspend the middle part of the vehicle frame, springs for the front and rear axles, and a supplementary spring adapted to oppose said rear springs to arrest undue recoil oscillations of the vehicle frame.

6. In a vehicle, the combination with a fulcrum subframe having semi-elastic longitudinal beams attached directly to the axles or housings thereof of the supporting wheels, which axles also form cross members for said longitudinal beams, of bearings at or near the middle of said longitudinal beams, a cross-shaft adapted to turn in said bearings, a supporting saddle for said cross-shaft, a spring carried on said saddle and adapted to suspend the middle part of the vehicle frame, end springs for the front and rear axles, and a supplementary spring adapted to oppose said end springs to arrest undue recoil oscillations of the vehicle frame.

7. A vehicle embodying a semi-elastic subframe adapted to support the middle portion of the weight of said vehicle, a spring hinged on said subframe near the middle thereof and adapted to carry the middle part of the frame of the vehicle, springs near each end of said vehicle, a supplemental spring adapted to oppose the springs near the rear end of the vehicle when the vehicle is not heavily loaded, means for permitting disengagement of said supplemental spring when the vehicle is under load, and means for re-engaging said supplemental spring upon a recoil exceeding a predetermined amplitude.

8. A vehicle embodying a semi-elastic subframe adapted to form a fulcrum for part of the upper suspended load, horizontally-disposed leaf-springs hinged near the center of the longitudinal beams of said subframe, an upper main frame for said vehicle, means for rigidly securing said springs at their ends to said main frame, link connections between the forward ends of said springs and the main frame, a front spring of full elliptic form parallel with the axle and adapted to resist side thrusts, helical springs for the rear axle, an opposer spring for the rear axle, and stirrups for the upper frame and surrounding the ends of the opposer spring, said opposer spring being adapted to oppose said helical springs only when recoil exceeds a predetermined amplitude.

9. In a vehicle having front and rear axles, a subframe embodying longitudinally-extending frame members having rigid central portions and semi-elastic ends, said ends being pivotally supported on said front and rear axles, and a vehicle frame suspended upon springs carried by said subframe and axles.

10. In a vehicle having front and rear axles, bearings carried by said axles, a subframe embodying longitudinally-extending frame members having rigid central portions and semi-elastic ends, said ends being pivotally supported in said bearings, and a vehicle frame suspended upon springs carried by said subframe and axles.

11. In a vehicle having front and rear axles, transverse bearings carried by said axles, a subframe embodying longitudinally-extending frame members, each made up of a central rigid portion having semi-elastic end portions attached thereto, said end portions being adapted to be pivotally supported in said transverse bearings, and a vehicle frame suspended upon springs carried by said subframe and axles.

In testimony whereof, I affix my signature.

ALBERT F. SHORE.